United States Patent
Corradi et al.

(10) Patent No.: US 10,428,737 B2
(45) Date of Patent: Oct. 1, 2019

(54) GAS TURBINE DISASSEMBLY METHOD

(71) Applicant: ANSALDO ENERGIA SWITZERLAND AG, Baden (CH)

(72) Inventors: Mauro Corradi, Wettingen (CH); Tobias Christoph Huber, Herrischried (DE); Daniel Seng, Busslingen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 623 days.

(21) Appl. No.: 15/138,766

(22) Filed: Apr. 26, 2016

(65) Prior Publication Data

US 2016/0312705 A1 Oct. 27, 2016

(30) Foreign Application Priority Data

Apr. 27, 2015 (EP) .................................... 15165232

(51) Int. Cl.
| | |
|---|---|
| *F02C 7/20* | (2006.01) |
| *F02C 3/04* | (2006.01) |
| *F23R 3/00* | (2006.01) |
| *F01D 9/02* | (2006.01) |

(Continued)

(52) U.S. Cl.
CPC ............... *F02C 7/20* (2013.01); *F01D 9/023* (2013.01); *F01D 25/285* (2013.01); *F02C 3/04* (2013.01); *F23R 3/002* (2013.01); *F23R 3/60* (2013.01); *F05D 2220/32* (2013.01); *F05D 2230/68* (2013.01); *F05D 2230/70* (2013.01);

(Continued)

(58) Field of Classification Search
CPC .......... F01D 25/285; F01D 9/023; F02C 3/04; F02C 7/20; F05D 2220/32; F05D 2230/68; F05D 2230/70; F23R 2900/00017; F23R 2900/00019; F23R 3/002; F23R 3/60; Y02E 20/16

See application file for complete search history.

(56) References Cited

U.S. PATENT DOCUMENTS 3,842,595 A * 10/1974 Smith ...................... F02C 7/20
60/804
4,413,470 A * 11/1983 Scheihing ................ F23R 3/60
60/800

(Continued)

FOREIGN PATENT DOCUMENTS

| CN | 202746016 U | 2/2013 |
| CN | 104061596 A | 9/2014 |

(Continued)

OTHER PUBLICATIONS

European Search Report dated Nov. 3, 2015 for Application No. 15165232.8.

(Continued)

*Primary Examiner* — Jesse S Bogue
(74) *Attorney, Agent, or Firm* — Buchanan Ingersoll & Rooney PC

(57) ABSTRACT

A method is disclosed of disassembling a gas turbine which includes a combustor, a liner, a turbine vane carrier (TVC) and an outer housing, the method including disengaging the liner from the TVC and removing the TVC from the gas turbine. The liner is disengaged from the TVC before the TVC is removed, the liner remains inside the outer housing and the combustor remains in the outer housing.

6 Claims, 2 Drawing Sheets

(51) Int. Cl.
*F01D 25/28* (2006.01)
*F23R 3/60* (2006.01)

(52) U.S. Cl.
CPC ........... *F23R 2900/00017* (2013.01); *F23R 2900/00019* (2013.01); *Y02E 20/16* (2013.01)

(56) References Cited

U.S. PATENT DOCUMENTS

| | | | | |
|---|---|---|---|---|
| 5,052,176 | A | * | 10/1991 | Labatut ............... F02K 3/10 60/225 |
| 5,090,205 | A | * | 2/1992 | Foster ................ F01D 25/002 60/646 |
| 5,575,607 | A | * | 11/1996 | Grout ................ B66C 19/00 212/344 |
| 5,911,680 | A | * | 6/1999 | Takeoka ............. F01D 25/285 431/154 |
| 6,893,217 | B2 | * | 5/2005 | Brainch ............. F01D 9/041 415/189 |
| 9,322,556 | B2 | | 4/2016 | Melton et al. |
| 9,528,393 | B2 | * | 12/2016 | Huber ............... F01D 25/285 |
| 9,539,680 | B2 | | 1/2017 | Hashimoto |
| 9,574,460 | B2 | * | 2/2017 | Carlson ............... F23R 3/60 |
| 2011/0000080 | A1 | | 1/2011 | Arase et al. |
| 2012/0304664 | A1 | | 12/2012 | Cihlar et al. |
| 2013/0125551 | A1 | * | 5/2013 | Petty ............... F01D 25/30 60/752 |
| 2013/0139368 | A1 | | 6/2013 | Iseki et al. |
| 2013/0230392 | A1 | | 9/2013 | Hashimoto |
| 2014/0165397 | A1 | | 6/2014 | Holmes et al. |
| 2014/0260275 | A1 | | 9/2014 | Melton et al. |

FOREIGN PATENT DOCUMENTS

| | | |
|---|---|---|
| EP | 1887209 A2 | 2/2008 |
| EP | 2 256 318 A1 | 12/2010 |
| EP | 2 530 246 A2 | 12/2012 |
| EP | 2 743 458 A2 | 6/2014 |
| JP | 8-210642 A | 8/1996 |
| JP | 2007211643 A | 8/2007 |
| JP | 2013181503 A | 9/2013 |
| KR | 101192123 B1 | 10/2012 |

OTHER PUBLICATIONS

First Office Action and Search Report dated Mar. 6, 2019, by the Chinese Patent Office in corresponding Chinese Patent Application No. 201610267690.6, and an English Translation of the Office Action. (11 pages).

\* cited by examiner

GAS TURBINE DISASSEMBLY METHOD

TECHNICAL FIELD

The present disclosure relates to methods of disassembly for gas turbines, and particularly to methods of disassembly for gas turbines where the liner remains in the outer housing.

BACKGROUND OF THE INVENTION

In order to carry out maintenance on the turbine blades in a gas turbine, the combustor, sequential liner, outer insulation, fuel distribution system (FDS), turbine vane carrier (TVC), turbine housing and exhaust gas housing all have to be removed, which is very time-consuming. It has been appreciated that this is not ideal and could be improved.

SUMMARY OF THE INVENTION

The invention is defined in the appended independent claims to which reference should now be made.

A first aspect of the invention provides a method of disassembling a gas turbine comprising a turbine vane carrier (TVC), a liner, a combustor and an outer housing, comprising the steps of disengaging the liner from the TVC and removing the TVC from the gas turbine, wherein the liner is disengaged from the turbine vane carrier before the turbine vane carrier is removed, and wherein the liner remains inside the outer housing and the combustor remains in the outer housing. This can reduce maintenance time in case of a planned or forced outage event for a gas turbine, and can avoid the need to remove the combustor during vane and/or blade maintenance.

In one embodiment, the combustor remains in the same position relative to the outer housing, and the liner moves relative to the combustor. This can avoid the need to move the fuel distribution system.

One embodiment comprises the additional steps of removing a turbine housing and/or removing an exhaust gas housing (EGH) before the TVC is removed. This can provide access to the TVC.

In one embodiment, the liner is moved using jacking screws or a rail system when the liner is disengaged from the turbine vane carrier. This can provide an appropriate disengagement mechanism.

In one embodiment, after being disengaged the liner is supported by a support structure, the support structure being attached to another part of the gas turbine. In one embodiment, the support structure is attached to the outer housing, a rotor cover and/or the combustor. This can support the liner during subsequent maintenance of the gas turbine.

A second aspect of the invention provides a method of reassembling a gas turbine comprising a turbine vane carrier (TVC), a liner, a combustor and an outer housing, comprising the steps of inserting the TVC into the gas turbine and attaching the liner to the TVC, wherein the liner is attached to the turbine vane carrier after the turbine vane carrier is inserted, and wherein the liner remains inside the outer housing and the combustor remains in the outer housing. This can provide a suitable method of reassembling a gas turbine following disassembly as outlined above.

A third aspect of the invention provides a gas turbine for carrying out the method described above, comprising a turbine vane carrier (TVC), a liner, a combustor, an outer housing and a liner disengagement and support system to disengage the liner and to support the liner. This apparatus can be provided to reduce maintenance time in case of a planned or forced outage event for a gas turbine, and can avoid the need to remove the combustor during vane and/or blade maintenance.

In one embodiment, the liner disengagement and support system comprises a support structure for supporting the liner, the support structure being attached to another part of the gas turbine. In one embodiment, the support structure is attached to the outer housing, a rotor cover and/or the combustor. This can provide suitable support for the liner during subsequent gas turbine maintenance.

In one embodiment, the liner disengagement and system comprises a support structure that comprises a combustor flange, a liner flange and at least one jacking screw. This can provide both disengagement and support within the same system.

In one embodiment, the liner disengagement and support system comprises a liner flange and at least one jacking screw.

In one embodiment, a hula seal is placed at a join between the liner and the combustor. This can provide an appropriate support for the liner to move relative to the combustor. In one embodiment, the liner is a sequential liner.

BRIEF DESCRIPTION OF THE DRAWINGS

An embodiment of the invention will now be described by way of example only and with reference to the accompanying drawings in which.

DETAILED DESCRIPTION OF THE PREFERRED EMBODIMENTS

Figure 1:
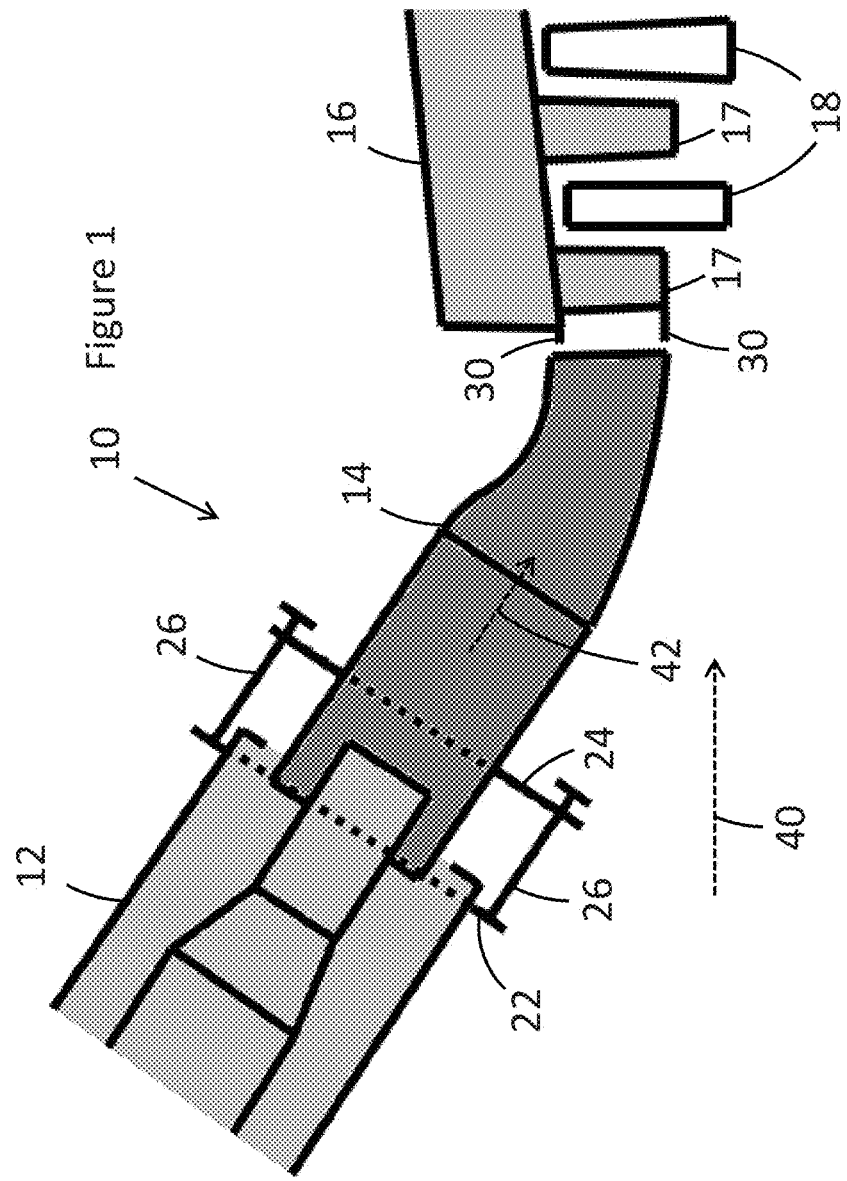
FIG. 1 shows a diagram of a cross-section of part of a gas turbine, with the sequential liner disengaged from the turbine vane carrier and with a sequential liner disengagement and support system.

FIG. 1 shows part of a gas turbine 10, comprising a combustor 12, a sequential liner 14, a turbine vane carrier (TVC) 16 comprising a plurality of vanes 17, and a plurality of blades 18. The gas turbine 10 also comprises an outer housing (or combustor housing; not shown).

A combustor flange 22 is attached to the combustor 12 and a sequential liner flange 24 is attached to the sequential liner 14. The combustor flange 22 and the sequential liner flange 24 are attached to one another by jacking screws 26. The combustor flange 22, sequential liner flange 24 and jacking screws 26 are a sequential liner disengagement and support system, with methods of use described in more detail below.

The turbine vane carrier 16 is shown disengaged from the sequential liner 14. Attachment screws or bolts 30 for attaching the sequential liner 14 to the turbine vane carrier 16 can be seen on the turbine vane carrier 16. When the gas turbine 10 is in use, the hot gas flow 42 through the gas turbine 10 would be in a conventional manner, through the sequential liner 14 and past the vanes 17 and blades 18.

Figure 2:
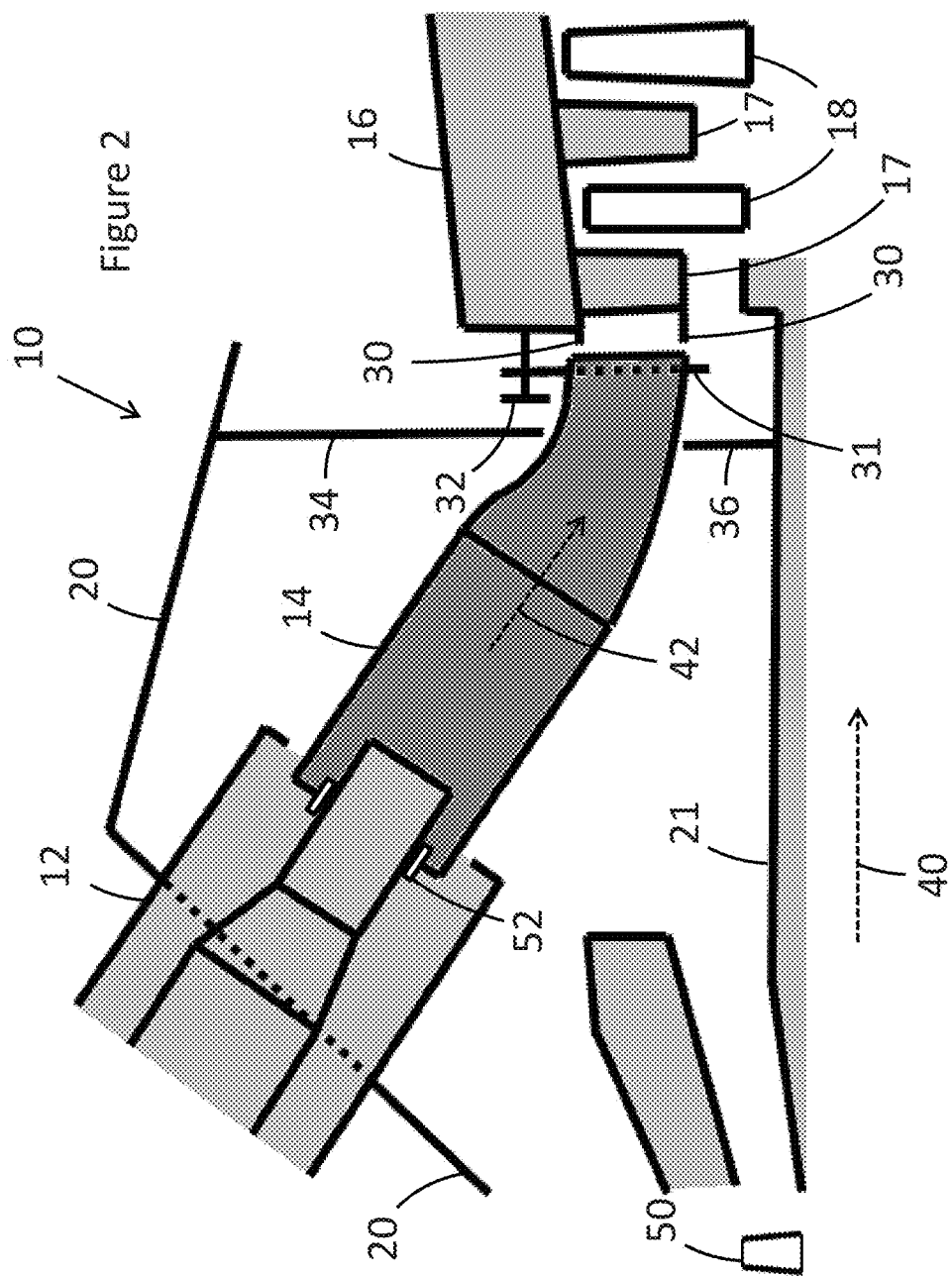
FIG. 2 shows a diagram of a cross-section of part of a gas turbine, with the sequential liner disengaged from the turbine vane carrier and with an alternative sequential liner disengagement and support system.

FIG. 2 shows part of a gas turbine 10 similar to that shown in FIG. 1, and additionally shows an outer housing 20 and a rotor cover 21. Instead of a combustor flange 22, sequential liner flange 24 and jacking screws 26, an alternative sequential liner disengagement and support system is provided. A sequential liner flange 31 is attached to the sequential liner, and a jacking screw 32 attaches the sequential liner flange to the turbine vane carrier 16. A first support element 34 and a second support element 36 are also provided. The first and second support elements 34, 36 are attached to the outer housing 20 and rotor cover 21 respectively and arranged to support the sequential liner 14 when it is disengaged from the turbine vane carrier 16. For completeness, part of a compressor 50 is shown.

When disassembling a gas turbine 10 as described above, typically the exhaust gas housing (EGH) and the turbine housing (second turbine housing, TH2) would be removed first (both not shown in the figures). The sequential liner 14 is then disengaged from the turbine vane carrier 16. In the examples given above, this involves unscrewing the attachment screws 30 and then using the jacking screws 26 and/or jacking screws 32 to disengage the sequential liner 14 from the turbine vane carrier 16 by moving the sequential liner 14 away from the turbine vane carrier 16 (by pulling the sequential liner 14 in FIG. 1, and by pushing the sequential liner 14 in FIG. 2). Once the turbine vane carrier 16 is fully disengaged from the sequential liner 14, the turbine vane carrier 16 is removed from the gas turbine 10. The sequential liner 14 and the combustor 12 are not removed and remain in the gas turbine throughout, i.e. inside and/or attached to the outer housing 20. The combustor generally extends from outside the outer housing to inside the housing through a hole in the outer housing, as can be seen in the Figures. The combustor is therefore in the housing in the sense that it extends through the housing, and remains in the hole in the outer housing, even if it is moved relative to the outer housing. The sequential liner generally remains completely inside the outer housing.

When the sequential liner 14 is disengaged, it may move relative to the combustor 12. For example, the combustor 12 may be in direct or indirect contact with the sequential liner 14, for example indirectly via a hula seal (one possible location of a seal such as a hula seal is shown by box 52), and the sequential liner 14 can then be moved relative to the combustor 12 over the hula seal 52. The hula seal 52 is shown in FIG. 2 as an example for completeness and could be attached to the combustor 12 or to the sequential liner 14; other seals or supporting structures may also be used between the combustor 12 and the sequential liner 14. Alternatively, the combustor 12 may also be shifted at the same time as the sequential liner 14 when the sequential liner 14 is disengaged.

In one example, the sequential liner 14 moves about 5 to 40 mm, preferably 10 to 20 and most preferably about 10 to 12 mm, relative to the other parts of the gas turbine (e.g. the outer housing 20, the rotor cover 21, the fuel distribution system, the blades 18 and optionally the combustor 12). This movement is typically in the turbine axis direction 40, although it may also include significant movement radial to turbine axis direction 40, particularly in embodiments such as that in FIG. 1 where the jacking screws 26 are at an angle from the turbine axis direction 40. In other embodiments, the sequential liner 14 may move considerably more or less than 40 mm—the main requirement is that the sequential liner 14 is disengaged sufficiently from the turbine vane carrier 16 so that the turbine vane carrier 16 can be removed from the gas turbine 10.

To reassemble a gas turbine, the various steps described above may be carried out in reverse. An existing gas turbine may be retrofitted by disassembling the existing gas turbine in a conventional manner, retrofitting the gas turbine to add the parts required to carry out a method of disassembly as described herein, and reassembling the existing gas turbine. The gas turbine could then either be reassembled in a conventional manner or including a method as described above but in reverse.

The gas turbine 10 may be part of a combined cycle power plant, for example. The combustor may be a single stage combustor (with a liner between the combustor and the turbine) or a two stage combustor (with two combustion stages and a sequential liner, as shown in the Figures), for example. For simplicity, this description concentrates on the example of a two stage combustor.

A typical arrangement of the main parts of the gas turbine is as follows, though various deviations from this may occur. The gas turbine 10 comprises a compressor, a combustor and a turbine. The combustor 12 is attached to the outer housing 20, the fuel distribution system and the sequential liner 14. The combustor 12 is normally partly within the outer housing 20 and partly outside the outer housing 20 (as shown for example in FIG. 2). The sequential liner 14 is attached to/in contact with the combustor 12 at its upstream end and to the turbine vane carrier at its downstream end. The turbine vane carrier 16, the one or more vanes 17 and one or more blades 18 are part of a turbine. The vanes 17 are part of and attached to the turbine vane carrier 16 and the turbine vane carrier 16 is attached to an exhaust system and to the sequential liner 14. The blades 18 are attached to a rotor. The outer housing 20 is attached to at least the compressor 12 and the second turbine housing. The rotor cover 21 extends around the rotor. The second turbine housing is a housing extending around the turbine vane carrier 16. The second turbine housing is attached to the outer housing 20 on one side, and the outer housing 20 is upstream of the second turbine housing in the turbine axis direction 40. On the other side, an exhaust gas housing is attached to the second turbine housing, with the exhaust gas housing being downstream of the second turbine housing in the turbine axis direction 40. The exhaust gas housing extends around the exhaust gas system downstream of the turbine.

The sequential liner disengagement and support system of FIG. 1 (combustor and sequential liner flanges 22, 24 and jacking screws 26) may be combined with the sequential liner disengagement and support system of FIG. 2 (sequential liner flange 31 and jacking screw 32, with first and/or second support elements 34, 36) in the same embodiment. More generally, the sequential liner disengagement and support system would be a liner disengagement and support system in the case of a single stage combustor. Similarly, the sequential liner flanges 22, 24, 31 would be liner flanges.

Flanges and jacking screws are just one option for moving and/or securing the sequential liner, and other options could also be employed. For example, the sequential liner could be moved and/or supported on a guide system such as a tube system or a rail system.

Some sort of support is generally necessary for the sequential liner 14 before, during and after disengagement. In the embodiment of FIG. 1, the combustor and sequential liner flanges 22, 24 and the jacking screws 26 can provide support throughout the process. In the embodiment of FIG. 2, the sequential liner flange 31 and the jacking screw 32 can only support the sequential liner before and during disengagement, as the jacking screw 32 is then separated from the turbine vane carrier and the turbine vane carrier 16 is subsequently removed. After disengagement, first and/or second support elements 34, 36 can be provided to support the sequential liner 14. Although the first and second support elements are described as being attached to the outer housing and rotor cover respectively, support elements attached to the combustor or to other parts of a gas turbine could also be used, essentially any appropriate nearby part that is not removed during maintenance; this could depend on what type of maintenance is being carried out. Alternatively or additionally, a sequential liner disengagement and support system as shown in FIG. 1 could be provided to support the sequential liner 14.

One or more attachment screws 30 may be provided. After disengagement of the turbine vane carrier 16 from the sequential liner 14, the attachment screws 30 may be attached to the turbine vane carrier 16 or to the sequential liner 14. The attachment screws 30 may also be removed entirely. Where a plurality of attachment screws 30 is provided, one or more attachment screws 30 may be attached to the turbine vane carrier 16 and others to the sequential liner 14 after disengagement. Instead of attachment screws or bolts 30, another appropriate disengageable fastening system may be used.

Where jacking screws 32 are included, the jacking screws 32 also need to be disengaged from the turbine vane carrier 16 after the sequential liner 14 is disengaged from the turbine vane carrier 16. In some embodiments, a jacking screw or screws 26, 32 could be attached to an existing part of the sequential liner 14 and/or to an existing part of the combustor 12, rather than to the flanges 24, 31 described above.

While FIG. 2 includes two support elements, first support element 34 and second support element 36, some embodiments provide only one support element. The first and second support elements 34, 36 can be removable, and could be inserted prior to disengagement of the sequential liner 14 from the turbine vane carrier 16. Part or all of the other sequential liner disengagement and support systems described herein could also be removable. Various forms of attachment can be used for the support systems used herein, including bolts, screws, welding, brazing, slotting the support systems in, or simply bracing them, depending on what the support systems are attached to and whether the support systems are permanent or merely put in place during maintenance. A similar variety of connection can be envisaged between the support systems used herein and the sequential liner, although generally the sequential liner should be able to move relative to the support system during disassembly and assembly.

Whilst various parts are described as not being moved, some of these parts could also be removed without departing from the invention, for maintenance or otherwise. For example, the blades 18 normally remain in place during the method described above, but one or more blades 18 could subsequently be removed. Similarly, the combustor could subsequently be removed, with the sequential liner being left in the outer housing. The apparatus described above also does not preclude the possibility of disassembling the gas turbine in a conventional manner when the need arises, for example removal of the combustor if access to the combustor is required.

Various modifications to the embodiments described are possible and will occur to those skilled in the art without departing from the invention which is defined by the following claims.

REFERENCE NUMERALS

| 10 | gas turbine |
| 12 | combustor |
| 14 | (sequential) liner |
| 16 | turbine vane carrier |
| 17 | vane |
| 18 | blade |
| 20 | outer housing (combustor housing) |
| 21 | rotor cover |
| 22 | combustor flange |
| 24 | (sequential) liner flange (combustor end sequential liner flange) |
| 26 | jacking screw |
| 30 | attachment screw or bolt |
| 31 | (sequential) liner flange (turbine vane carrier sequential liner flange) |
| 32 | jacking screw |
| 34 | first support element |
| 36 | second support element |
| 40 | turbine axis direction |
| 42 | hot gas flow |
| 50 | compressor |
| 52 | hula seal |

EGH = exhaust gas housing
FDS = fuel distribution system
TH2 = second turbine housing
TVC = turbine vane carrier

The invention claimed is:

1. A method of disassembling a gas turbine having a combustor, a liner, a turbine vane carrier and an outer housing, the method comprising:
   attaching a support structure to support a portion of the liner proximate the turbine vane carrier prior to disengaging the liner from the turbine vane carrier,
   disengaging the liner from the turbine vane carrier and removing the turbine vane carrier from the gas turbine,
   wherein the liner is disengaged from the turbine vane carrier before the turbine vane carrier is removed, and
   wherein the liner remains inside the outer housing and the combustor remains in the outer housing.

2. The method of claim 1, wherein the combustor remains in the same position relative to the outer housing, and the liner moves relative to the combustor.

3. The method of claim 1, comprising:
   removing a turbine housing and/or removing an exhaust gas housing (EGH), before the turbine vane carrier is removed.

4. The method of claim 1, comprising:
   moving the liner using jacking screws or a rail system after the liner is disengaged from the turbine vane carrier.

5. The method of claim 1, wherein after being disengaged the liner is supported by the support structure, the support structure being attached to another part of the gas turbine.

6. The method of claim 5 wherein the support structure is attached to the outer housing, a rotor cover and/or the combustor.

* * * * *